F. E. GILFORD.
MILLING CUTTER.
APPLICATION FILED MAR. 30, 1912.
1,071,615.
Patented Aug. 26, 1913.
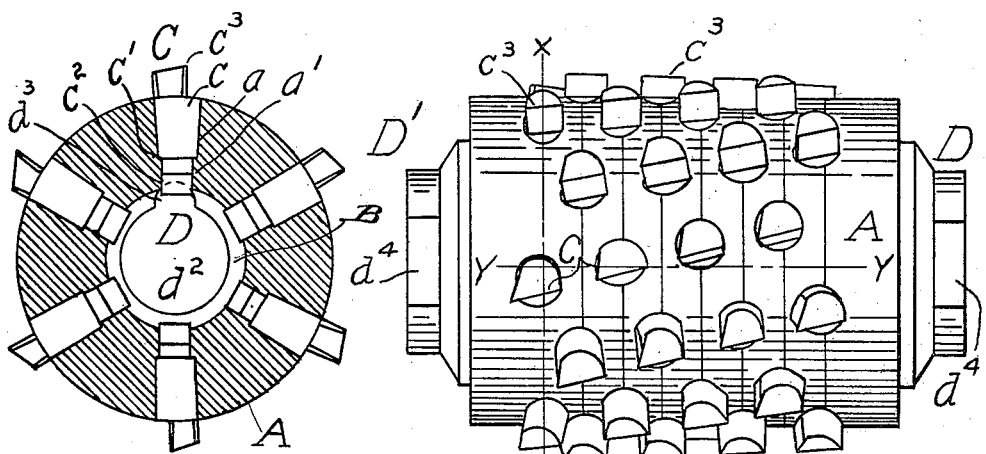
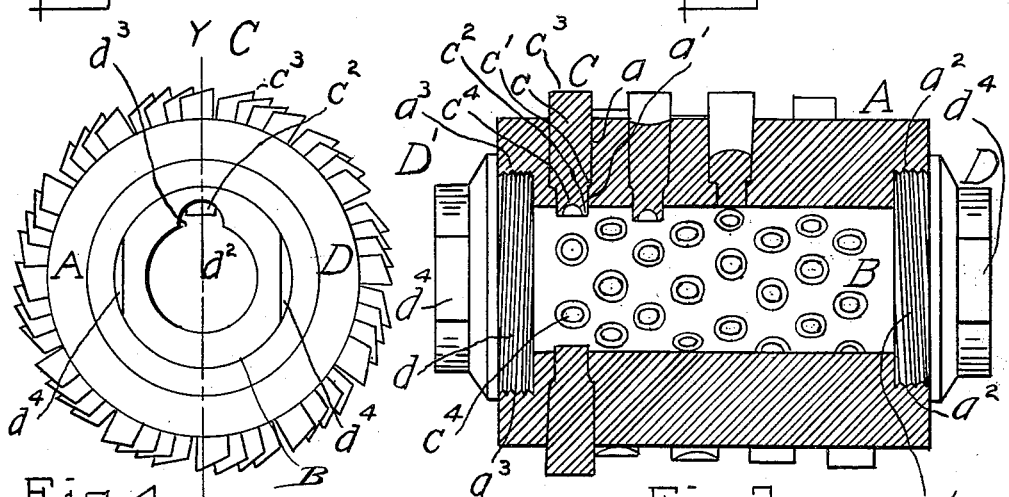
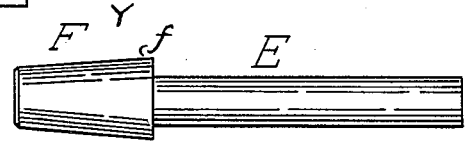
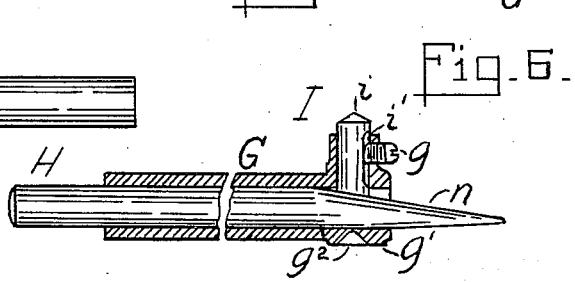
Witnesses
Harry G. Little
John M. Stark
Inventor
Frederick E. Gifford
By Fremont E. Shurtleff
Attorney

UNITED STATES PATENT OFFICE.

FREDERICK E. GILFORD, OF CONCORD, NEW HAMPSHIRE.

MILLING-CUTTER.

1,071,615.  Specification of Letters Patent.  Patented Aug. 26, 1913.

Application filed March 30, 1912. Serial No. 687,550.

*To all whom it may concern:*

Be it known that I, FREDERICK E. GILFORD, a citizen of the United States, residing at Concord, in the county of Merrimack and State of New Hampshire, have invented a new and useful Milling-Cutter, of which the following is a specification.

My invention relates to improvements in milling cutters in which the teeth or cutters are removable from the body of the cutter, and the objects of my improvement are, first, to provide a quick and easy method for inserting the teeth into said body; second, to provide a seat for the teeth when in place, which will hold them firmly as though formed as an integral part of the body of the cutter, and, third, to provide a quick and easy method of removing the teeth when it is desired to take them out for the purpose of renewal or for other reasons. I attain these objects by the device illustrated in the accompanying drawings, in which—

Figure 1 shows a front view of the cutter in elevation; Fig. 2, a cross section on line $x$—$x$ of Fig. 1; Fig. 3, a longitudinal section on line $y$—$y$ of Fig. 1; Fig. 4, an end view of the cutter; Fig. 5, a tool to extract a large number or the whole of the teeth at one operation; and Fig. 6, a tool to extract the teeth singly.

Similar figures and letters refer to similar parts in all the drawings.

In the drawings, Figs. 1 to 4 inclusive, A is the cylindrical body of the milling cutter, in which is the concentric chamber B of a greater diameter than the arbor or mandrel on which the cutter is designed to be used; C are the teeth, the body $c$ of which is tapering and formed to fit closely in the tapering holes, $a$, formed in the body of the cutter. The teeth, C, project inwardly through the body A and slightly into chamber B. These teeth may be made tapering the whole length of their body, but in the drawings herewith the holes or sockets $a$, are made smaller than the regular taper, as at $a'$, and the tooth is formed with a shoulder, as at $c'$, and the inward end $c^2$, is of a diameter to easily pass through the contracted part of the socket. The purpose of this is to obtain a smaller diameter of that part of the tooth projecting into chamber B, than if the tooth was given a regular taper its whole length, as it thus prevents filling the whole surface of the circumferential wall of the chamber with the ends of these teeth. On the inward end of each tooth C, is a circular cavity or indentation, $c^4$ (Fig. 3), for the purpose of receiving the end of punch I of tool shown in Fig. 6, as hereinafter described. The part of tooth C, projecting outwardly from body A, carries a cutting edge $c^3$, and may be of any desired shape. Teeth C may be disposed on the body A in any desired order. In the drawings they are shown in helical arrangement.

At each end of body A is a concentric recess having circumferential right and left handed threads, $a^2$ and $a^3$ respectively (Fig. 3).

D and D' are caps forming the end walls of chamber B provided with arbor holes $d^2$. Cap D is provided with a right hand screw-thread $d'$, and D' with a left-hand screw-thread $d$, by means of which they are screwed into the recesses at the ends of body A.

$d^3$ is a keyway cut in each cap, and $d^4$ are flats on caps D and D' for the purpose of applying a wrench when the caps are to be attached or taken off body A.

Fig. 5 shows a tool with which to knock teeth C from their sockets in body A of the cutter. As illustrated it is reduced to something less than half the scale of the other drawings. It consists of a handle E and a tapering portion F, the diameter of said tapering portion, at its largest point $f$, to be of a size to pass easily through chamber B when teeth C are out of their sockets and do not project into chamber B, but so that portion F will come in contact with the lower ends $c^2$ of the teeth when they are projecting into said chamber.

The tool shown in Fig. 6, consists of a holder G shown in longitudinal section. This holder contains a rod or plunger H, the end $h$ being wedge shaped. Movable in holder G and at right angles to plunger H is the punch I, having a pyramidal point $i$ adapted to engage with the indentations $c^4$ at the lower ends of teeth C. This punch is provided with a longitudinal slot $i'$, in which set-screw $g$ is loosely engaged to retain the punch in the holder.

$g'$ is a shoulder projecting from the holder G.

$g^2$ is a notch cut in shoulder $g'$ opposite to and in line with point $i$ of punch I. This notch is for the purpose of allowing shoulder $g'$ to drop over ends $c^2$ of teeth C, in the process of ejecting a tooth as hereinafter described. The distance between shoulder $g'$ and point $i$ when plunger H is withdrawn and punch I is at its lowest point, should be less than the distance between the ends $c^2$ of the teeth C which are oppositely disposed in chamber B.

By means of the device described and shown in the specification and drawings, the milling cutter body A is easily filled with teeth by simply dropping them into the sockets $a$, care being taken that the cutting edges $c^3$ are facing in the right direction, after which each tooth may be given a slight tap to keep it from dropping out. When the cutter is put onto the work, owing to the taper of socket $a$ and body $c$ of the teeth, the latter will be forced solidly into their sockets and become as immovable, while milling, as though the teeth were integral with the body. If, on account of wear or breakage, it is desired to take out all of the teeth, the caps D and D' are taken off and the tapered end F of the tool shown in Fig. 5 is inserted in chamber B and driven through by a blow on end of handle E. In being thus forced through, the incline of tapered end F will bear against each and all of the projecting ends $c^2$ and the teeth will be easily ejected from their sockets. If one only or a few of the teeth are to be taken out, the tool shown in Fig. 6 is used. With the plunger H withdrawn so that punch I will fall to its lowest point, the end of the tool containing the punch is inserted in chamber B until the point $i$ of the punch is adjacent to the indentation $c^4$ in the end of the tooth to be removed, and the notch $g^2$ is adjacent to the end $c^2$ of the opposite tooth. The notch $g^2$ is then allowed to drop over the end of the tooth to which it is adjacent, so that shoulder $g'$ will bear upon the wall of chamber B. A light tap is then given on the outer end of plunger H, and the wedge shaped end $h$ is driven under punch I, raising the same. The point $i$ will then enter indentation $c^4$ of the tooth to be removed, which tooth will be pushed out of its socket.

I claim:—

In a milling cutter, a cylindrical body having caps at each end, arbor holes through centers of said caps, an inner cylindrical chamber of a diameter larger than said arbor holes, tooth sockets in said body tapering from the circumference thereof toward and opening into said chamber, and teeth in said sockets, the bodies of which taper toward and project into said chamber.

FREDERICK E. GILFORD.

Witnesses:
F. E. SHURTLEFF,
NELLIE O'BRIEN.